(12) United States Patent
Deakin et al.

(10) Patent No.: US 11,155,151 B2
(45) Date of Patent: Oct. 26, 2021

(54) TRANSMISSION FOR ENERGY STORAGE DEVICE, ENERGY STORAGE DEVICE AND METHOD FOR CONTROLLING THE TRANSMISSION

(71) Applicant: Punch Flybrid Limited, Northampton (GB)

(72) Inventors: Andrew Deakin, Oxfordshire (GB); Ernesto Zedan, Buckinghamshire (GB)

(73) Assignee: Punch Flybrid Limited, Northampton (GB)

( * ) Notice: Subject to any disclaimer, the term of this patent is extended or adjusted under 35 U.S.C. 154(b) by 112 days.

(21) Appl. No.: 16/576,403

(22) Filed: Sep. 19, 2019

(65) Prior Publication Data

US 2020/0009958 A1 Jan. 9, 2020

Related U.S. Application Data

(63) Continuation of application No. 15/556,753, filed as application No. PCT/GB2016/050535 on Mar. 1, 2016, now Pat. No. 10,457,131.

(30) Foreign Application Priority Data

Mar. 12, 2015 (GB) .................................... 1504232

(51) Int. Cl.
*B60K 6/10* (2006.01)
*F16D 21/08* (2006.01)
*F16H 3/097* (2006.01)
*F16H 3/08* (2006.01)

(52) U.S. Cl.
CPC .............. *B60K 6/105* (2013.01); *F16D 21/08* (2013.01); *F16H 3/097* (2013.01); *F16H 2003/0815* (2013.01); *Y02T 10/62* (2013.01)

(58) Field of Classification Search
CPC ................................. B60K 6/105; F16D 21/08
See application file for complete search history.

(56) References Cited

U.S. PATENT DOCUMENTS 10,457,131 B2 * 10/2019 Deakin ................... B60K 6/105
10,821,817 B2 * 11/2020 Zedan ...................... B60K 6/10

FOREIGN PATENT DOCUMENTS

WO WO-2011080512 A1 * 7/2011 ............. H02K 7/025

* cited by examiner

*Primary Examiner* — Derek D Knight
(74) *Attorney, Agent, or Firm* — McCracken & Gillen LLC

(57) ABSTRACT

A transmission for an energy storage and recovery system comprises a variable slip transmission and a clutch arranged to transmit drive while slipping. The level of torque transmitted through the slipping clutch is dependent on the clutch force but is independent of the clutch slip speed. Preferably the clutch is provided by a plurality of clutches connected in parallel in a range extender. When drive is transferred between clutches in parallel, the clutch forces of both clutches are controlled to maintain the total torque transmitted by the clutches. This reduces torque fluctuations at the energy source/sink during clutch transfer. Where there are two slipping clutches in series, one clutch is controlled to provide the required torque and the other clutch is controlled in response to a clutch slip speed. This helps to control the speed of rotation of the mass between the clutches.

18 Claims, 7 Drawing Sheets

TRANSMISSION FOR ENERGY STORAGE DEVICE, ENERGY STORAGE DEVICE AND METHOD FOR CONTROLLING THE TRANSMISSION

CROSS REFERENCE TO RELATED APPLICATIONS

This application is a continuation of U.S. patent application Ser. No. 15/556,753 filed on Sep. 8, 2017, which is a U.S. National stage application based on International Application No. PCT/GB2016/050535, filed on Mar. 1, 2016, which claims the benefit of priority to GB1504232.8, filed on Mar. 12, 2015, the entire contents of these applications are incorporated by reference as if set forth in their entirety herein.

FIELD OF DISCLOSURE

The present invention relates to a transmission for transmitting drive between a device for storing energy (such as a flywheel) and a source and/or sink of energy such as a vehicle drivetrain, and the invention also relates to methods of controlling such a transmission.

BACKGROUND

An energy storage and recovery system (ESRS) allows unwanted energy in a machine to be stored, and subsequently to be used to drive, or help to drive, the machine. This improves the overall efficiency of the machine. Examples are the storage of energy that would otherwise be wasted through braking when a vehicle slows down, and the storage of energy returned to a drive mechanism when a heavy component such as a hydraulic arm is lowered. In principle, an energy storage and recovery system can use any form of energy storage device that is capable of receiving energy in the form of motion (usually in the form of rotation) and storing the energy, and is capable subsequently of returning some of the stored energy in the form of motion, again normally in the form of rotation. Normally, a flywheel is used as the energy storage device.

In order to enable an efficient use of the energy storage and recovery system, it is preferable to include, in the transmission between the energy storage device and the energy source/sink (the mechanism from which energy is received and to which energy is delivered), some means for varying the transmission ratio so that the system as a whole can accommodate a large range of speed differences between the energy storage device and the energy source/sink. Additionally, it will normally be desired for the relative speed of movement of the energy storage device and the energy source/sink to change substantially continuously. For example, if the energy storage device is a kinetic energy storage device such as a flywheel, and the energy source/sink is a connection to a vehicle transmission, the transfer of energy will normally imply that the speed of rotation of the flywheel increases as the speed of rotation of the vehicle transmission decreases (storage of braking energy) or vice versa (acceleration using stored energy). This implies that the transmission ratio between the energy storage device and the energy source/sink must change continuously in order to allow energy to be transmitted in the desired manner. Even when the transfer of energy does not require a change of speed at the energy storage device or at the energy source/sink (e.g. the energy storage device is an electric generator/motor and a battery, or the energy source/sink is a lifting device), the energy storage and recovery will often be more efficient if the transmission ratio between the energy storage device and the energy source/sink can be varied. It is known to provide an energy storage and recovery system with a continuously variable transmission such as a belt drive with means to vary the drive radius of a pulley for the belt or alternatively a toroidal continuously variable transmission such as is described in WO 2009/030948.

US 2011/0071000 proposes a system in which a flywheel transmits positive torque (to deliver energy) or negative torque (to store energy) to the wheels of a vehicle through a clutch, and a continuously variable transmission is located in a drive path between the clutch and the vehicle wheels. The system determines the amount of torque to be applied by the flywheel, and this is used to calculate the torque to be transmitted by the clutch. This is used to calculate the clutch pressure to be applied to the clutch. The clutch slips during transmission of torque, and because the torque transmitted by a slipping clutch is determined by the effective friction of the clutch surfaces and the applied clutch force, the torque is independent of the clutch slip speed. The system has a desired clutch slip speed, and determines the desired direction of slip depending on whether the torque to be applied to the wheels is positive or negative (i.e. acceleration force or braking force). The actual clutch slip speed is measured and a slip error is calculated. The continuously variable transmission is adjusted in order to minimise the slip error. Although the clutch slip speed does not affect the clutch torque, the amount of energy lost by frictional heat generation in the clutch does depend on the slip speed. Therefore, the desired clutch slip has a low magnitude.

WO 2011/048102 proposes a system in which energy stored in a flywheel is used to provide torque fill-in during periods of interruption of torque caused by a gearshift event in a vehicle with an automated manual transmission. The flywheel is connected to a variator via an isolating coupling, and the variator is mechanically coupled to the vehicle driveline. In the variator, only speed is controlled which makes it difficult to control torque. Therefore a regulating coupling, including a slipping clutch, is provided between the variator and the vehicle driveline. The variator speed control is used to maintain a consistent but limited slip across the clutch.

In the present application, the term "variable slip transmission" or "VST" is used to refer to a transmission in which a first drive path, including a first clutch, would have a first drive path ratio if the first clutch transmitted drive without slipping, and a second drive path, including a second clutch, would have a second drive path ratio if the second clutch transmitted drive without slipping, wherein the first and second clutches are in parallel and are operable to slip substantially continuously while transmitting drive. Because the clutches slip while transmitting drive, the actual drive path ratio of a drive path, when its clutch is engaged, depends on both (a) the drive path ratio that the drive path would have if the clutch was not slipping and (b) the slip speed (rate of slip) of the clutch. Optionally, there may be further drive paths, which may have further clutches (operable to slip substantially continuously while transmitting drive) in parallel with the first and second clutches. As the rate of slip (slip speed) of a clutch changes, the effective transmission ratio (i.e. the ratio of rotational velocity at one end of the transmission to rotational velocity at the other end of the transmission) also varies. Accordingly, by allowing the slip speed of the engaged clutch to vary, and switching clutches as appropriate, it is possible to provide a transmission with a behaviour similar to that of a continuously variable transmission. Nevertheless, it can still be difficult to transmit torque smoothly between the energy storage device and the energy source/sink. It is desirable to transmit torque smoothly so that the effect of the energy storage and recovery system on the torque applied to the vehicle drivetrain or other energy source/sink does not cause jerks or other rapid changes of torque. An example of a variable slip transmission is known, from WO 2011/080512.

SUMMARY

According to an aspect of the present invention there is provided an energy storage and recovery system comprising an energy storage device and a transmission for connecting the energy storage device to an energy source and/or sink. The transmission comprises a clutch and a transmission ratio adjuster (such as a variable slip transmission) between the clutch and the energy storage device.

The term "transmission ratio adjuster" refers to any mechanism which allows the transmission ratio to change. Preferably at least one transmission ratio adjuster in the present invention comprises a slipping clutch and preferably at least one transmission ratio adjuster includes a plurality of clutches in parallel.

In an aspect of the invention, the transmission has at least two clutches in parallel, such that drive is transferred from one clutch to another, and the operation for transferring drive is controlled so that the torque transmitted through one clutch increases while the torque through another clutch decreases and the total torque transmitted by all the clutches in parallel is controlled to be at a predetermined level (which may not be constant) or within a predetermined range.

In a method of operating the energy storage and recovery system, the clutch is permitted to slip while transmitting torque between the energy sink and/or source and the transmission ratio adjuster, and is controlled so as to transmit a predefined level of torque (which may or may not be a constant torque) during at least some periods while the transmission ratio is being changed by the transmission ratio adjuster.

In some embodiments, two or more such clutches are provided in parallel, a first clutch is associated with a first transmission ratio and a second clutch is associated with a second transmission ratio, and the clutches are part of a second transmission ratio adjuster. In this case, it is preferred that the system is operated so that, in order to provide a continuous change of transmission ratio between the energy storage device and the energy source and/or sink, the first transmission ratio adjuster (closer to the energy storage device) varies its transmission ratio substantially continuously and the second transmission ratio adjuster (closer to the energy source and/or sink) adjusts its ratio discontinuously. Accordingly, for some of the time (and preferably for most of the time), changes in transmission ratio are performed by mechanical changes that take place entirely on the side of the clutch that is remote from the energy source and/or sink.

In an embodiment of the present invention, at least some unevenness of torque or angular velocity, resulting from imperfect control of variation of transmission ratio or from the effects of speeding up or slowing down the rotation of an inertial mass during change of transmission ratio, take place on the side of the slipping clutch remote from the energy source and/or sink, and the slipping clutch tends to isolate the energy source and/or sink from these effects because the torque transmitted by it is not affected by changes in the clutch slip speed.

If the transmission comprises two slipping clutches in series, it may be difficult to control the part of the transmission between the clutches. In an aspect of the present invention, a transmission for an energy storage device has first and second slipping clutches in series, and one of the clutches is controlled (e.g. by control of its clutch force) to keep the torque transmitted through it at a predetermined level (which may vary over time) or in a predetermined range, and the other clutch is controlled (e.g. by control of its clutch force) to regulate the slip speed (i.e. how fast the clutch slips) in one of the clutches. In this way, it is possible to keep the rotational speed of the part of the transmission between the clutches related to the rotational speed of the part of the transmission on the other side of one of the clutches, and the part of the transmission between the clutches cannot speed up or slow down in an uncontrolled manner. At the same time, the torque transmitted by the transmission is also controlled.

It does not matter which clutch has its slip speed controlled, (i.e. the clutch that is controlled to control the rate of slip may be controlling its own slip speed or may be controlling the slip speed of the other clutch). However, it is preferred that the clutch that is controlled to control the level of torque is the clutch further from the energy storage device (and therefore closer to the energy source and/or sink), since this will help to insulate the energy source and/or sink from torque fluctuations arising at the clutch that is controlled to control the rate of slip. Such torque fluctuations tend to arise as a result of clutch force variations in response to changes in the monitored clutch slip.

In the case where the transmission ratio adjuster (or the first transmission ratio adjuster if there is more than one) has a clutch, it may be operated with a slipping clutch so that there is more than one slipping clutch connected in series between the energy storage device and the energy source and/or sink.

Preferably the transmission ratio adjuster or adjusters are operated so that the total clutch slip through the transmission is minimised, except during handover between clutches in the case where the transmission includes two or more clutches connected in parallel. This minimises the energy loss due to clutch slip. Preferably, if the transmission is operated with two clutches in series that are both slipping, the transmission is controlled to maintain constant slip (or controlled slip, e.g. the slip speed is kept within a predetermined range) in the slipping clutch closest to the energy source/sink.

In an aspect of the present invention, a transmission for an energy storage and recovery system comprises a variable slip transmission and a clutch arranged to transmit drive while slipping. The level of torque transmitted through the slipping clutch is dependent on the clutch force but is independent of the clutch slip speed. Preferably the clutch is provided by a plurality of clutches connected in parallel in a range extender. When drive is transferred between clutches in parallel, both clutches are controlled (e.g. by control of their respective clutch forces) to maintain the total torque transmitted by the clutches. This reduces torque fluctuations at the energy source/sink during clutch transfer. Where there are two slipping clutches in series, one clutch is controlled to provide the required torque and the other clutch is controlled in response to a clutch slip speed. This helps to control the speed of rotation of the mass between the clutches. If one of the slipping clutches is part of a variable slip transmission, the slip speed of the other clutch in series with it should be controlled, since an attempt to control the slip speed of a slipping clutch in a variable slip transmission will tend to interfere with the proper operation of the variable slip transmission.

An aspect of the present invention provides a transmission for transmitting torque between an energy storage device and an energy source and/or sink, the transmission comprising a plurality of clutches in series, each of said clutches being operable to transmit torque while slipping substantially continuously, a first of said plurality of clutches being controlled (e.g. by control of the clutch force applied to it) to transmit a predetermined level or range of torque while slipping substantially continuously and a second of said plurality of clutches being controlled (e.g. by adjustment of the clutch force applied to it) in response to variations in the speed of slip of one of said plurality of clutches.

Another aspect of the present invention provides an energy storage and recovery system comprising an energy storage device coupled to the transmission, in which either the second of said plurality of clutches is coupled between the energy storage device and the first of the said plurality of clutches or the first of said plurality of clutches is coupled between the energy storage device and the second of the said plurality of clutches.

Another aspect of the present invention provides a method of controlling a transmission comprising a plurality of clutches in series between an energy storage device and an energy source and/or sink, comprising controlling the torque transmitted by a first of the plurality of clutches (e.g. by controlling the clutch force applied to the first of the clutches), and controlling a second of the plurality of clutches (e.g. by adjusting the clutch force applied to the second of the clutches) in response to variations in the speed of slip of one of said plurality of clutches.

Another aspect of the present invention provides a transmission for transmitting torque between an energy storage device and an energy source and/or sink, the transmission comprising a first clutch and a second clutch in parallel with one another, and a clutch control system arranged to transfer drive from one of the first and second clutches to the other by reducing the torque transmitted by said one of the first and second clutches (e.g. by reducing the clutch force applied to it) at the same time as increasing the torque transmitted by the other of the first and second clutches (e.g. by increasing the clutch force applied to it) so that there is a period of time in which both of the first and second clutches transmit torque while slipping, and controlling the first and second clutches (e.g. by controlling the respective clutch forces applied to them) so as to keep the total torque transmitted throughout the said period of time at a predefined level or within a predetermined range.

Another aspect of the present invention provides an energy storage and recovery system comprising an energy storage device coupled to the transmission, and in which the transmission comprises a transmission ratio adjuster that includes the first and second clutches and may also comprise a second transmission ratio adjuster that includes a third clutch and a fourth clutch in parallel with one another.

Another aspect of the present invention provides a method of controlling a transmission between an energy storage device and an energy source and/or sink, the transmission comprising a first clutch and a second clutch in parallel with one another, the method comprising transferring drive from one of the first and second clutches to the other by reducing the torque transmitted by said one of the first and second clutches (e.g. by reducing the clutch force applied to it) at the same time as increasing the torque transmitted by the other of the first and second clutches (e.g. by increasing the clutch force applied to it) so that there is a period of time in which both of the first and second clutches transmit torque while slipping, and controlling the first and second clutches (e.g. by controlling the respective clutch forces applied to them) so as to control the total torque transmitted by the first and second clutches throughout the said period of time.

Further aspects and optional features are set out in the accompanying claims.

Various aspects of the present invention may be combined.

BRIEF DESCRIPTION OF THE DRAWINGS

Embodiments of the present invention, given by way of non-limiting example, will now be described with reference to the accompanying drawings.

DETAILED DESCRIPTION

Figure 1:
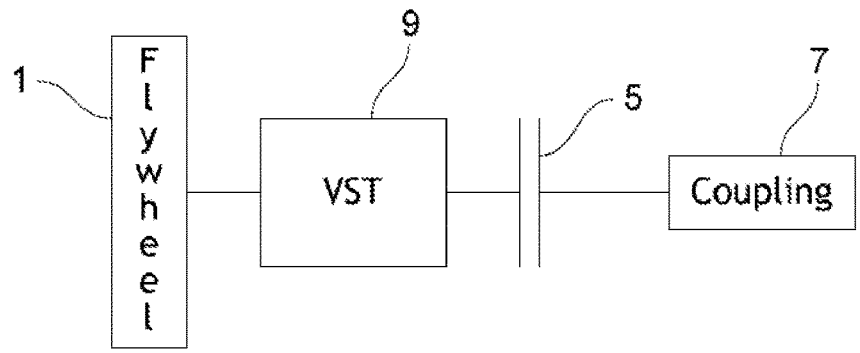
FIG. 1 shows schematically a first embodiment of the present invention, having a variable slip transmission and a slipping clutch.

FIG. 1 shows apparatus according to a first embodiment of the present invention. In this embodiment an apparatus for storing and delivering energy (energy storage and recovery system) comprises an energy storage device in the form of a flywheel 1 and a transmission made up of a transmission ration adjuster, in the form of a variable slip transmission (VST) 9, and a clutch 5. The transmission connects the flywheel 1 to an energy source and/or sink, in the form of a drivetrain coupling 7 for coupling the transmission of FIG. 1 to a drivetrain, such as the drivetrain between the motor and the wheels of a vehicle or a drivetrain for a device that is moved against gravity or another force such as a loading beam or a lift, or the drivetrain of some other moving part such as a rotary cab of an excavator or other construction vehicle. The variable slip transmission 9 (also known as a clutched flywheel transmission or CFT), may be as described for example in WO 2011/080512.

The clutch 5 is controlled so as to slip during operation of the transmission of FIG. 1. The clamp force applied to the clutch 5 is controlled in accordance with the torque which it is desired to apply to the drivetrain coupling 7 in order to extract energy from or deliver energy to the drivetrain. If the required level of torque is constant, the clamp force applied to the clutch 5 will be constant. Since the torque transmitted through the slipping clutch 5 is determined by the clamp force and the friction characteristics of the clutch, and is independent of the slip speed of the clutch, this ensures that the torque applied by the clutch 5 to the drivetrain coupling 7 remains substantially constant regardless of any torque variations experienced by the flywheel 1 and the variable slip transmission (VST) 9. Preferably the clutch 5 in the present embodiment is operated with a controlled slip, e.g. the slip speed is maintained substantially constant or is kept within a pre-set range, and the transmission ratio between the flywheel 1 and the drivetrain coupling 7 is varied by variation of the transmission ratio through the variable slip transmission 9. The slip speed of the clutch 5 is monitored and the clutch force of the active clutch (i.e. the clutch being used to transmit torque) in the VST 9 is adjusted to maintain the slip speed of the clutch 5 at the desired value or in the desired range.

The variable slip transmission 9 includes slipping clutches. Accordingly, it would be possible to control the clutch force (the clamp force applied between the plates of the clutch) so as to maintain constant torque through the clutch that is currently being used. However, it is preferred to include the clutch 5 as shown in FIG. 1, in order to isolate the drivetrain coupling 7 from torque variations that may arise as the VST 9 hands over drive from one clutch to another.

Figure 2:
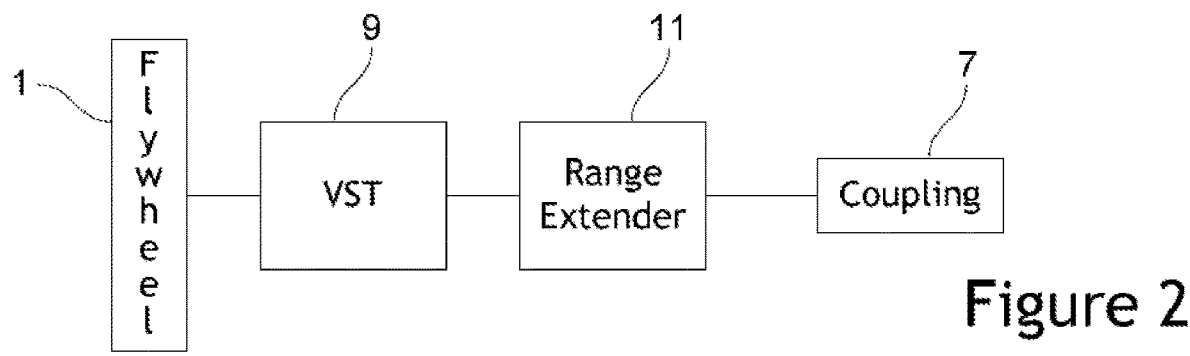
FIG. 2 shows schematically a second embodiment of the present invention, having a variable slip transmission and a range extender.

FIG. 2 shows another embodiment, in which the transmission includes a range extender 11 between the VST of FIG. 1 and the drivetrain coupling 7. Although variable slip transmissions are advantageous because they allow a substantially continuous variation in the transmission ratio without abrupt ratio changes, they normally have an overall range of ratios from the highest transmission ratio to the lowest transmission ratio which is narrower than may often be required. The total range of transmission ratios available in the transmission as a whole can be increased by providing a second ratio adjuster (i.e. a second mechanism or device which can change the transmission ratio) in series with the VST, and this is referred to as a range extender.

In some circumstances, the range extender 11 can be a simple gearbox but in the present embodiment it is an arrangement of gear paths with different transmission ratios combined with selecting clutches that may have the same mechanical construction as the variable slip transmission of WO 2011/080512. However, since substantially continuous variation of the transmission ratio is provided by the VST, it is not necessary to operate the range extender 11 with variable clutch slip speeds. Instead, the range extender 11 can be operated with a constant ratio while the VST 9 sweeps through its total range of transmission ratios. Then the transmission ratio of the range extender 11 is shifted. Normally, the range extender 11 will be made so that the ratio shift between successive transmission ratios is substantially the same as the total ratio range of the VST 9. Consequently, when the VST 9 reaches the end of its range of ratios, a ratio change in the range extender 11 can be accompanied by a shift in the VST 9 from one end of its ratio range to the other, and then the VST 9 can sweep through its ratio range again. In this way, the total range of ratios in the transmission can easily be doubled or tripled.

Because the range extender 11 used in FIG. 2 has selecting clutches to enable changes in its transmission ratio, it is possible to slip the clutch in the range extender 11 for the ratio in use, and this provides a slipping clutch between the VST 9 and the drivetrain coupling 7 to isolate the drivetrain coupling 7 from torque fluctuations at the VST 9. There may be fluctuations in the torque applied to the drivetrain coupling 7 as the range extender 11 changes ratio. In this case, more complete isolation could be provided by including the separate clutch 5 between the range extender 11 and the drivetrain coupling 7. However, it is possible to reduce the torque fluctuations as the range extender 11 changes ratio, by slipping both the clutch that is coming into use and the clutch that is going out of use while transferring clutch force from one clutch to the other, and controlling the clutch forces applied during this period to keep the total torque transferred through the range extender at the desired value. In practice, this may be regarded as providing sufficient benefit, particularly since it will add to the complexity of the transmission to include the separate clutch 5 in addition to the range extender 11.

Figure 3:
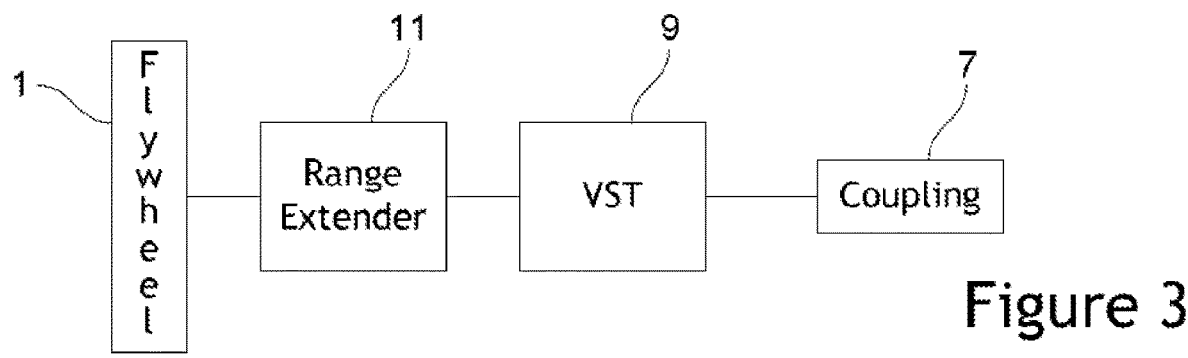
FIG. 3 shows schematically a third embodiment of the present invention, having a range extender and a variable slip transmission.

The embodiment of FIG. 3 is similar to the embodiment of FIG. 2, except that it has the range extender 11 towards the flywheel 1 and the variable slip transmission towards the drivetrain coupling 7. In this case, the slipping clutch in use at any given time in the variable slip transmission 9 acts to isolate the drivetrain coupling 7 from torque fluctuations arising within the range extender 11. Although the slip speed of the active clutch in the VST 9 varies, whereas the slip speed of the clutch 5 in FIG. 1 and the slip speed of the active clutch in the range extender 11 in FIG. 2 are preferably kept constant, the clutch of the VST 9 is effective in FIG. 3 to isolate the drivetrain coupling 7 from torque variations since the torque transmitted through the clutch depends only on the clamp force of the clutch and not on the slip speed. In the embodiment of FIG. 3 there is no need to operate the range extender 11 with a slipping clutch, since the range extender 11 is not being used to provide torque isolation. Therefore the range extender 11 in this embodiment will normally be operated with the active clutch fully engaged without slip.

At present, the embodiment of FIG. 3 is less preferred than the embodiment of FIG. 2 because the variable slip transmission 9 will make clutch transitions, in which drive is handed over from one clutch to another, more frequently than the range extender 11 and torque fluctuations tend to arise, or be more noticeable, particularly during such clutch handover operations. Therefore it is preferable to have the variable slip transmission 9, with frequent clutch handover operations, at the end of the transmission towards the flywheel 1, and to have the range extender 11, with less frequent clutch handover operations, at the end of the transmission towards the drivetrain coupling 7. In the embodiment of FIG. 3 the clutch forces during clutch handover operations are controlled to maintain a constant or desired value of total torque, as described above with reference to the range extender in FIG. 2, in order to reduce the torque fluctuations applied to the drivetrain coupling 7.

Figure 4:
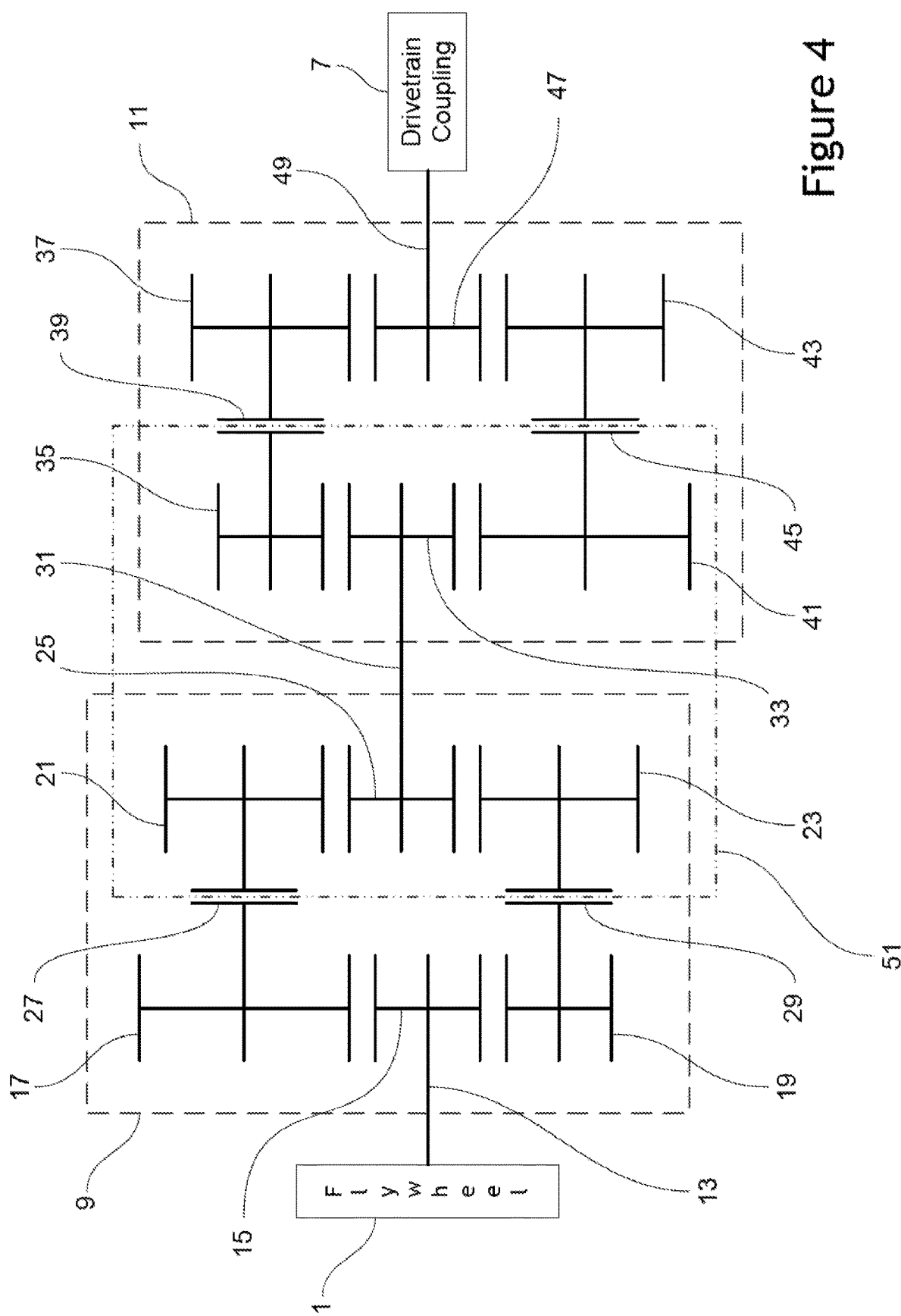
FIG. 4 shows schematically the construction of a transmission of an embodiment of the present invention having a variable slip transmission and a range extender.

FIG. 4 shows schematically the internal construction of a variable slip transmission 9 and a range extender 11 in the embodiment of FIG. 2. The gear wheels in FIG. 4 are only schematic, and their sizes in the drawing do not represent the actual relative sizes of different wheels and therefore no information about gear ratios should be derived from FIG. 4.

The flywheel 1 rotates with a flywheel shaft 13, which rotates with a flywheel-side input/output gear 15 of the variable slip transmission 9. This meshes with a first gear 17 of a first ratio transmission path and a first gear wheel 19 of a second ratio transmission path. The first ratio path in the VST 9 also includes a second gear 21, and the second ratio path includes a second gear 23, and the gears 21, 23 mesh with a drivetrain coupling-side input/output gear 25. The gears 17, 21 of the first ratio path in the VST 9 are connected through a first clutch 27, and the gears 19, 23 of the second ratio path are coupled through a second clutch 29. During normal operation, one of the ratio paths through the variable slip transmission will be selected, and the relevant clutch 27 or 29 will be engaged to transmit drive while slipping, whereas the other clutch will be fully disengaged. Accordingly, drive will pass through the variable slip transmission from one of the input/output gears 15, 25 to the other via the gears and clutch of the selected ratio path. The transmission ratio through the variable slip transmission 9 will depend on the gear ratio of the selected ratio path together with the degree of slip in the corresponding clutch.

The drive coupling-side input/output gear 25 of the variable slip transmission rotates with an intermediate shaft 31, which in turn rotates with a flywheel-side input/output gear 33 of the range extender 11. The range extender 11 has substantially the same construction as the variable slip transmission 9, and accordingly it has a first ratio path with a first gear 35 and a second gear 37 coupled by a clutch 39, and a second ratio path having a first gear 41 and a second gear 43 coupled by a clutch 45. The second gears 37, 43 of the respective paths mesh with a drive coupling-side input/output gear 47 of the range extender 11. The input/output gear 47 rotates with a shaft 49 connected to the drivetrain coupling 7.

In operation, drive is transmitted between the energy storage device (i.e. flywheel 1) and the energy source/sink (i.e. drivetrain coupling 7) via the intermediate shaft 31, the variable slip transmission 9 and the range extender 11. Except during an operation to switch from one gear ratio path to another gear ratio path, only one clutch within the variable slip transmission 9 and only one clutch within the range extender 11 will be engaged and transmitting torque. Both of the engaged clutches will be slipping. The total angular velocity ratio between the flywheel 1 and the drivetrain coupling 7 will be determined by their respective rotational speeds. In the transmission, this ratio will be provided by (a) the total gear ratio of the gearing in the active ratio path through the variable speed coupling 9, (b) the angular velocity of slip (the slip speed) of the clutch in the active ratio path of the variable speed transmission, (c) the total gear ratio of the gearing in the active ratio path through the range extender 11, and (d) the angular velocity of slip (the slip speed) of the clutch in the active ratio path of the range extender 11. Factors (a) and (b) determine the effective ratio through the variable slip transmission between the flywheel shaft 13 and the intermediate shaft 31. Factors (c) and (d) determine the effective ratio through the range extender between the intermediate shaft 31 and the drivetrain coupling shaft 49.

As can be seen in FIG. 4, the construction of the range extender 11 in this embodiment is substantially the same as the construction of the variable slip transmission 9. However, except during an operation to hand over the transmission of torque from one clutch to another, the system is controlled so that the clutch slip speed in the range extender 11 is constant, or is maintained within a predetermined range, whereas the clutch slip speed in the variable slip transmission 9 is allowed to vary continually as required by changes in the relative rotational velocities of the flywheel 1 and the drivetrain coupling 7. Since energy is transmitted through a slipping clutch from the faster plate to the slower plate, the direction of slip in the clutches will correspond to the direction in which energy is passed through the transmission shown in FIG. 4. Accordingly, when the torque demand applied to the energy storage and recovery system is translated into control signals for the transmission, the direction of required transfer of energy defines the required direction of clutch slip in the transmission.

During equilibrium operation of the transmission, the intermediate shaft 31 will receive energy (i.e. will be driven) by the application of torque from one of the flywheel shaft 13 and the drivetrain coupling shaft 49, and it will transmit energy (i.e. it will drive) the other of the flywheel shaft 13 and the drivetrain coupling shaft 49 by applying torque thereto. Unless the torques acting on the two ends of the intermediate shaft 31 are equal and opposite, the intermediate shaft 31 must speed up or slow down under the resultant net torque. From this, it can be understood that the direction of slip will be the same in both the slipping clutch of the variable slip transmission 9 and the slipping clutch of the range extender 11. If the direction of slip is different for the two clutches, then torque is being applied in the same direction to both ends of the intermediate shaft 31, and therefore the intermediate shaft 31 will speed up or slow down until the direction of slip of one of the clutches reverses and a stable situation is reached in which both clutches slip in the same direction.

In operation of the transmission of FIG. 4, when no transfer of energy into or out of the energy storage and recovery system is required, all clutches will be disengaged in at least one of the variable slip transmission 9 and the range extender 11, so that the flywheel 1 and the drivetrain coupling 7 are disengaged from each other. When transfer of torque, (and therefore transfer of energy) is required, ratio paths through the variable slip transmission 9 and the range extender 11 will be selected in order to provide clutch slips in the correct direction to transmit torque as required, and then the clutches for the selected ratio paths will be engaged with a predetermined clutch pressure or force chosen in accordance with the amount of torque that the energy storage and recovery system is required to apply to the drivetrain coupling 7. Preferably, the selection of ratio paths through the variable slip transmission 9 and the range extender 11 is selected throughout the time while torque is transmitted between the flywheel 1 and the drivetrain coupling 7 so as to minimise the total amount of clutch slip in the system (and therefore to minimise the total energy loss), except briefly during operations to hand torque transmission over from one clutch to another in the variable slip transmission 9 or the range extender 11.

Preferably, although both the active clutch in the variable slip transmission 9 and the active clutch in the range extender 11 are initially engaged with a clutch force determined by the required torque to be transmitted through the clutch, the force applied to one of these clutches is subsequently modulated in response to any measured error in the slip speed of the active clutch 39 or 45 in the range extender 11, whereas the clutch force of the other active clutch is not. In principle, the clutch slip speed control could be applied either to the active clutch of the range extender 11 or to the active clutch of the variable slip transmission 9. In practice, it is preferred to apply this control to the slipping clutch that is further from the drivetrain coupling 7 (i.e. the slipping clutch of the variable slip transmission 9 in this embodiment). This is has the effect that the torque applied to the drivetrain coupling 7 is not affected by small variations in the clamp force of the clutch to which control is applied (and therefore small variations in transmitted torque) in response to errors in the slip speed of the active clutch in the range extender 11.

This arrangement, in which one active clutch is controlled to apply the required torque while the other is controlled to minimise errors in clutch slip, is more stable than an attempt to control both clutches purely by the required torque without responding to errors in the slip speed of the controlled-slip clutch. If both slipping clutches are controlled purely to transmit the required amount of torque, without any monitoring of errors in clutch slip speed, minor inaccuracies in clutch control may result in the torque transmitted to the intermediate shaft 31 through one clutch not balancing exactly the torque transmitted to the intermediate shaft 31 through the other clutch. This will cause the intermediate shaft 31 to experience a small overall net torque and it will speed up or slow down in a manner which may become very difficult to control. By monitoring the slip speed of the controlled speed clutch, and controlling the clamping pressure or force in one of the clutches accordingly, it is possible to avoid any inappropriate speed changes of the intermediate shaft 31.

While the clutches are engaged and torque is being transmitted between the flywheel 1 and the drivetrain coupling 7, the flywheel 1 will continually slow down and the drivetrain coupling 7 will speed up, if energy is being returned from the flywheel 1 to the drivetrain coupling 7, or alternatively the flywheel 1 will continually speed up while the drivetrain coupling 7 slows down if energy is being transferred from the drivetrain coupling to the flywheel 1. Therefore the relative angular velocities of the drivetrain coupling 7 and the flywheel 1 are continually changing. Because the transmission is controlled so that clutch slip in the range extender 11 is constant, or controlled to be within a narrow range, the rotation of the intermediate shaft 31 will speed up or slow down with the drivetrain coupling 7 and the shaft 49 for as long as the same clutch is engaged in the range extender 11. The continuous change in the relative angular velocities is accommodated by a continuous change in the slip speed of the active clutch in the variable slip transmission 9. Preferably, the drive ratio path through the variable slip transmission 9 is selected so as to have a minimum clutch slip while ensuring that the direction of clutch slip is correct to transmit torque in the required direction.

As the relative angular velocities of the flywheel 1 and the drivetrain coupling 7 vary, the clutch slip speed in the variable speed transmission 9 will reduce. In order to ensure that torque is transmitted through the variable slip transmission 9 in the correct direction, it is necessary to change the gear ratio path through it, and therefore to change the active clutch in the variable slip transmission 9, as the clutch slip speed in the variable slip transmission 9 approaches zero. Accordingly, the variable slip transmission 9 will switch drive through its drive ratio paths in turn until it reaches the end of its range of transmission ratios. If there are any transient variations in torque transmitted through the variable slip transmission 9 while it changes its drive ratio path, these torque variations are not transmitted to the drivetrain coupling 7 because the torque transmitted through the range extender 11 is determined by the clutch pressure applied to the active clutch of the range extender 11, which is in turn determined by the torque demand signal. Transient changes in the torque transmitted through the variable slip transmission 9 are accommodated by transient accelerations or decelerations of the intermediate shaft 31, resulting in small slip speed errors in the active clutch of the range extender 11. The feedback control from the clutch slip speed in the range extender 11 to the clutch clamp force in the variable speed transmission 9 results in further small changes in the torque transmitted through the variable slip transmission 9 to compensate for the previous variations, thereby adjusting the speed of the intermediate shaft 31 and returning the clutch slip speed in the range extender 11 to the correct value (or keeping it within the correct range). As a result, the slip speed of the active clutch in the range extender 9 is controlled and remains substantially constant or within a controlled range, and therefore the intermediate shaft 31 speeds up or slows down together with the drivetrain coupling 7, while the transmission ratio through the variable slip transmission 9 varies over the available range.

If the flywheel 1 is transmitting torque to the drivetrain coupling 7, the drivetrain coupling 7 will normally be speeding up relative to the flywheel 1 while the variable slip transmission 9 progresses through its range of available transmission ratios. In each clutch of the variable slip transmission 9, the flywheel-side clutch plate must be rotating faster than the drivetrain-side clutch plate while the clutch is engaged, in order to transmit torque and energy in the correct direction. When the clutch slip in the variable slip transmission 9 approaches zero, the clutch for the next ratio path is engaged and the previous clutch is disengaged. The difference in gear ratios of the two ratio paths means that the flywheel-side clutch plate of the newly-engaged clutch is rotating substantially faster than its drivetrain-side clutch plate, enabling torque to be transmitted in the correct direction. As this path transmits torque, and the relative rotational velocities of the flywheel 1 and the drivetrain coupling 7 continue to vary, the relative speed difference between the plates of the clutch that has just disengaged will pass through zero and then the drivetrain-side clutch plate will begin to rotate faster than the flywheel-side clutch plate (i.e. the rotational speed difference in the disengaged clutch is now in the wrong direction). When the variable slip transmission 9 approaches the end of its transmission range, its last clutch will have a slip speed approaching zero while the speed difference across all the other clutches in the variable slip transmission 9 (which are disengaged) will be in the wrong direction.

When the variable slip transmission 9 reaches the end of its transmission ratio range, it is necessary to change the transmission ratio through the range extender 11 while the variable slip transmission 9 returns its transmission ratio to the other end of its range. However, at this moment there is a substantial speed difference in the wrong direction in the variable slip transmission clutch that is about to be engaged. I.e., if energy is being transmitted from the flywheel to the drivetrain, so that the flywheel-side clutch plate needs to rotate faster than the drivetrain-side clutch plate, the flywheel-side clutch plate of the clutch that is now to be engaged will in fact be rotating considerably slower than the drivetrain-side clutch plate. If the clutch is engaged in this state, drive and energy will be transmitted in the wrong direction, i.e. from the intermediate shaft 31 to the flywheel. Therefore in order to continue transmitting drive from the flywheel 1 to the drivetrain coupling 7, it is necessary to slow down the intermediate shaft 31 substantially. At the same time, the range extender 11 needs to change its drive ratio path by disengaging one of its clutches 39, 45 and engaging the clutch for the next ratio. The next ratio in the range extender 11 will be one suitable for driving the drivetrain coupling 7 at higher speeds, relative to the speed of the flywheel 1, than the ratio path currently in use. This means that the flywheel-side clutch plate for the new ratio path in the range extender 11 is rotating substantially faster relative to the drivetrain-side clutch plate than the required clutch slip speed in the range extender 11, and again the intermediate shaft 31 needs to be slowed down.

Accordingly, it can be seen that the speed of rotation of the intermediate shaft 31 is not required to change substantially as the variable slip transmission 9 changes from clutch to clutch as it moves through its transmission range, but the speed of rotation of the intermediate shaft 31 is required to change substantially when the range extender 11 switches clutches and the variable slip transmission 9 returns to the other end of its transmission ratio range. In principle, the speed of rotation of the intermediate shaft 31 can be changed by engaging either the new clutch required in the variable slip transmission 9 or the new clutch required in the range extender 11, or both new clutches. However, in order to minimise any fluctuation in the torque applied to the drivetrain coupling 7 while the range extender 11 hands drive over from one clutch to another, it is preferred that there is always engagement of at least one clutch in the range extender 11 and therefore at least part of the change in rotational speed of the intermediate shaft 31 will be brought about by engagement of the newly-selected clutch in the range extender 11 while this clutch slips with a higher speed than the desired steady state clutch slip speed or slip speed range. Additionally, since engagement of the newly-selected clutch in the range extender 11 results in transmission of torque through the range extender in the desired direction, whereas changing the speed of the intermediate shaft 31 by slipping clutch engagement in the variable slip transmission 9 involves transmission of torque through the clutch in the opposite direction, it is more efficient for most of the work involved in changing the speed of the intermediate shaft 31 to be done through engagement of the newly-selected clutch in the range extender 11, and the newly-selected clutch in the variable slip transmission 9 may remain entirely disengaged, or only engaged very slightly, until the speed difference between the two clutch plates is in the correct direction.

In order to speed up or slow down the intermediate shaft 31, it is necessary to speed up or slow down all the rotational masses that rotate with it. The magnitude of the moments of inertia of these masses, and whether they are part of the variable slip transmission 9 or part of the range extender 11, will depend on the details of the design and construction of the transmission in the energy storage and recovery system. In general, the mass that rotates with the intermediate shaft 31, and must be accelerated or decelerated with it, will be the mass between the clutches of the variable slip transmission 9 on the one hand and the clutches of the range extender 11 on the other hand. FIG. 4 shows a construction for the variable slip transmission 9 and the range extender 11 in which the clutches are placed between the two pairs of engaged gear wheels in each drive ratio path. Accordingly, the transmission of FIG. 4 can be divided into three separate rotating masses. A flywheel-side mass, that is coupled directly to the flywheel 1 and rotates with it, comprises the flywheel shaft 13, and the flywheel-side input/output gear 15 and the respective first gears 17, 19 of the variable slip transmission 9, together with the clutch plates and shafts connected to the first gears 17, 19. A drivetrain coupling-side mass, that is connected to the drivetrain coupling 7 and rotates with it, comprises the shaft 49, and the drivetrain coupling-side input/output gear 47, and the respective second gears 37, 43 of the range extender 11 together with the shafts and clutch plates connected with the second gears 37, 43. An intermediate mass, identified by broken-line box 51 in FIG. 4, comprises the intermediate shaft 31 itself together with the second gears 21, 23, the associated shafts and clutch plates and the drivetrain coupling-side input/output gear 25 of the variable slip transmission 9, and the first gears 35, 41, the associated shafts and clutch plates and the flywheel-side input/output gear 33 of the range extender 11.

Figure 5:
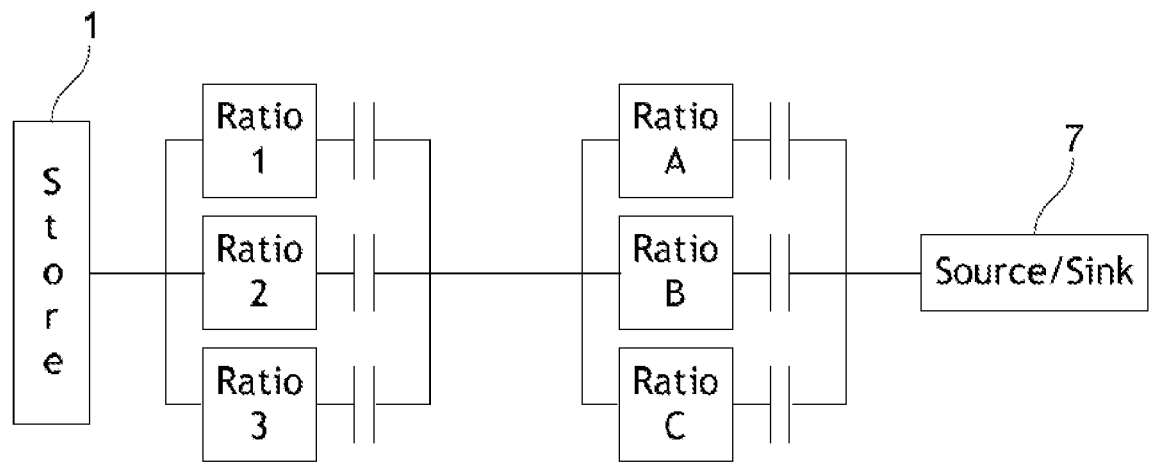
FIG. 5 shows schematically an embodiment of the present invention having two transmission ratio adjusters in series, with a 3-by-3 set of ratios.
Figure 6:
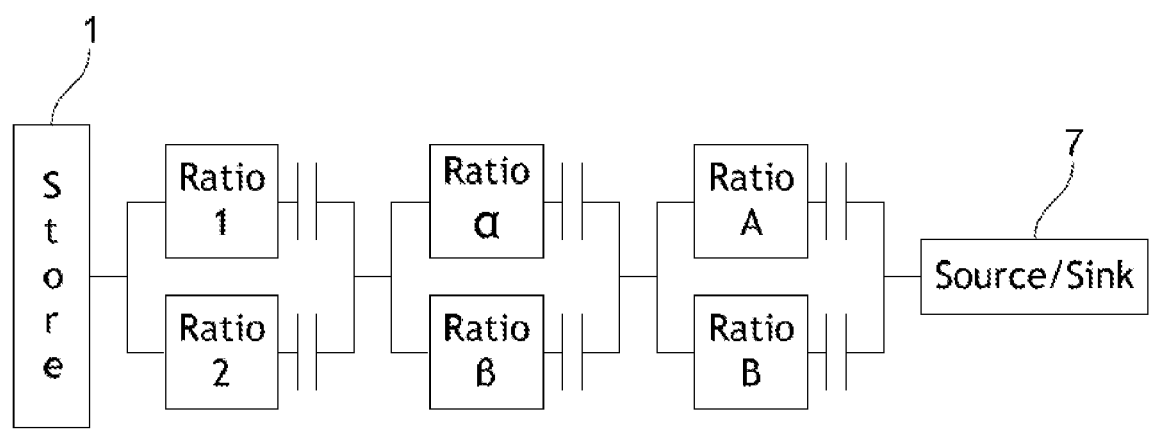
FIG. 6 shows schematically an embodiment of the present invention having three transmission ratio adjusters in series, with a 2-by-2-by-2 set of ratios.

The transmission illustrated in FIG. 4 has two drive ratio paths through the variable slip transmission 9 and two drive ratio paths through the range extender 11. This arrangement can be summarised as a "2×2" arrangement. However, other arrangements are possible. FIG. 5 shows a "3×3" arrangement having a variable slip transmission with three parallel drive ratio paths and a range extender with three parallel drive ratio paths. It is not necessary for the variable slip transmission 9 and the range extender 11 to have the same number of drive ratio paths, and a "3×2" or "2×3" arrangement is possible. Additionally, there may be more than one range extender. For example, there may be two range extenders connected in series, as shown in FIG. 6 which has a "2×2×2" arrangement.

A variable slip transmission and a range extender can each be regarded as a transmission ratio adjuster, since each of them can be operated to change the transmission ratio through it. In the arrangement of FIG. 6, there are three transmission ratio adjusters arranged in series. In principle, any of the transmission ratio adjusters in FIG. 6 could be configured as a variable slip transmission. However, it is currently preferred that the transmission ratio adjuster closest to the energy source/sink is the one that changes from one clutch to another least often. For this reason, it is preferable that in FIG. 6 the transmission ratio adjuster having ratios A and B is configured as a range extender, and the variable slip transmission is either the adjuster having ratios □ and □ or the adjuster having ratios 1 and 2. It should be noted that, while it is currently envisaged that the variable slip transmission will be the adjuster closest to the energy store, there is in principle no reason why the variable slip transmission should not be the central transmission ratio adjuster, with a range extender on either side. In an arrangement such as that shown in FIG. 6, where torque passes through more than two clutches between the energy store and the energy source/sink, it would be possible to use more than two slipping clutches in series. However, this is not necessary. The variable slip transmission needs to have slipping clutches in order to provide substantially continuous adjustment of transmission ratio by variable clutch slip. Additionally, it is desirable that the clutches closest to the energy source/sink are controlled to slip with clutch force substantially at a controlled or predefined value, in order to ensure that the torque transmission to the energy source/sink is substantially at a desired level. However, there is normally no need for any other clutches to slip, and therefore the clutches of the second range extender unit will normally be used either fully disengaged or fully engaged without slip.

Figure 7:
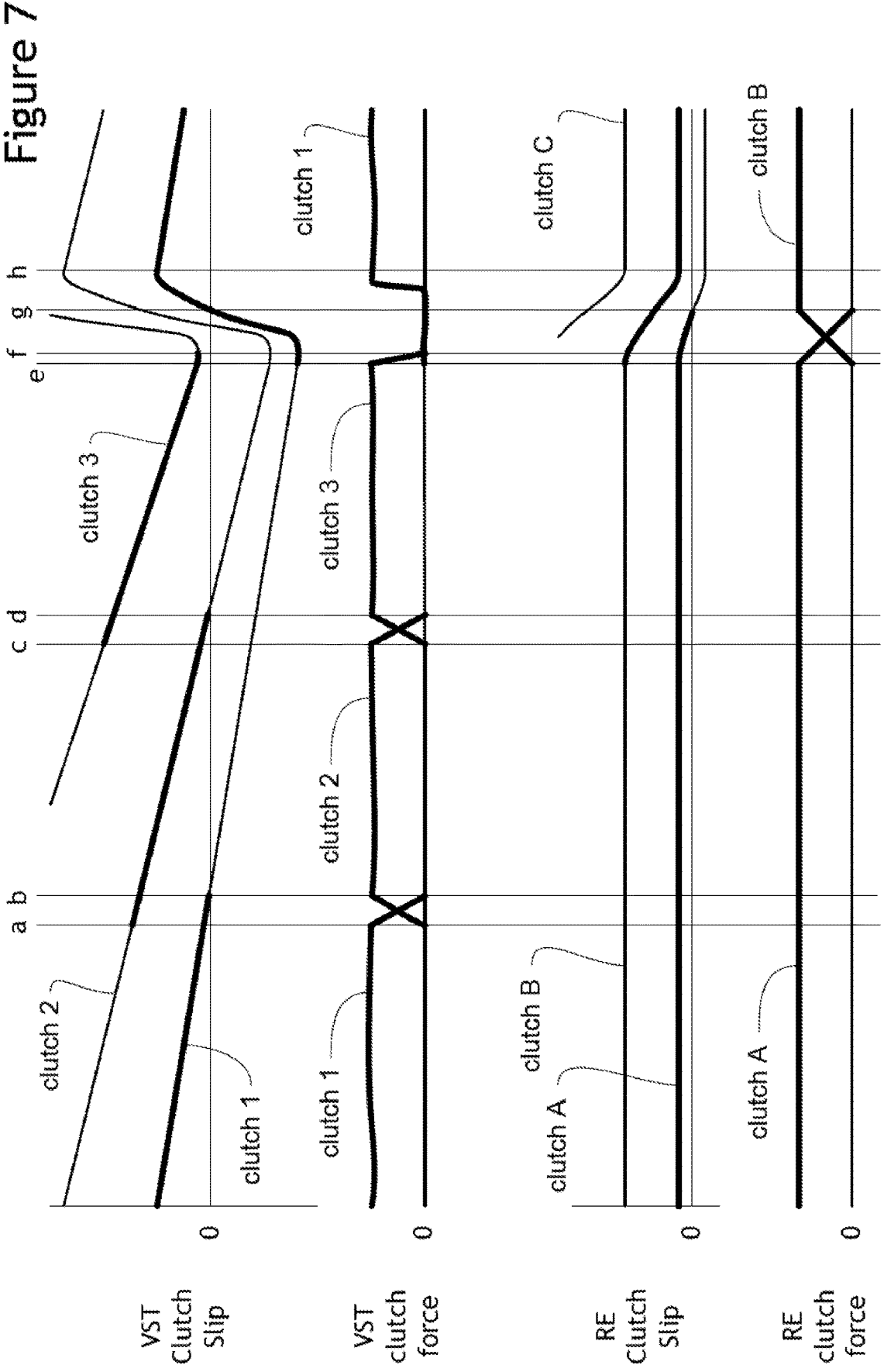
FIG. 7 shows graphs for clutch slip and clutch force in the variable slip transmission and the range extender of an embodiment of the present invention having a variable slip transmission towards the energy storage device and a range extender towards the energy source/sink, with a 3-by-3 set of ratios.

FIG. 7 shows schematically the clutch slip speed and the clutch force used during the operation of a "3×3" transmission in accordance with FIGS. 2 and 5, having a variable slip transmission towards the flywheel or other energy store and a range extender towards the drivetrain coupling or other energy source/sink. In this drawing, it is assumed that stored energy is being transferred from the energy storage device to the energy source/sink, so that drive is transmitted through the transmission from the energy storage device to the energy source/sink, and a positive value for clutch slip in the drawing indicates that the flywheel-side clutch plate rotates faster than the drivetrain-side clutch plate.

In FIG. 7, bold lines are used to show the clutches that transmit drive. Accordingly, the bold lines overlap for the period when two parallel clutches both transmit drive during a handover operation. Initially, clutch 1 of the variable slip transmission (VST) 9 and clutch A of the range extender (RE) 11 are selected, since this combination gives the minimum total clutch slip through the transmission. The clutch force for VST clutch 1 and RE clutch A is selected to transmit the required level of torque through the respective clutches, in accordance with the amount of torque required to be applied to the energy source/sink (drivetrain coupling 7). In this embodiment, the active clutch of the range extender is controlled to have a constant, low magnitude clutch slip speed. The clutch slip speed in the range extender 11 is monitored and any clutch slip speed error is used to modulate the clutch force applied to the active clutch in the variable slip transmission 9. Accordingly, the VST clutch force is controlled with a pre-set "feed forward" value based on the desired transmitted torque, which is modulated, for example through a proportional, proportional-integral or proportional-integral-differential control, with an error signal derived from the measured slip speed of the active clutch of the range extender. Therefore the VST clutch force in FIG. 7 is shown as fluctuating slightly. On the other hand, the range extender clutch force is not modulated in accordance with clutch slip speed, and therefore the clutch force applied to clutch A of the range extender is a constant value derived from the required torque to be transmitted to the energy sink/source (drivetrain coupling 7).

Initially, the rotational speed difference between the energy store and the energy sink/source is large, and accordingly VST clutch 1 has a relatively large slip speed. However, as energy is transmitted the flywheel slows down relative to the energy sink/source. Consequently, the slip speed of clutch 1 of the variable slip transmission 9 decreases. The slip speed of the variable slip transmission clutch is also monitored, in addition to the monitoring of the slip speed of the range extender clutch, and as the VST clutch slip speed approaches zero an operation is carried out to transfer drive from VST clutch 1 to VST clutch 2. If necessary, any actions required to prepare VST clutch 2 for operation (such as filling a hydraulic clutch with hydraulic fluid) are carried out shortly before the anticipated time when the clutch handover operation is to begin.

The handover operation from VST clutch 1 to VST clutch 2 begins at time a in FIG. 7. The clamp force on clutch 1 is steadily decreased from time a to time b while the clamp force on VST clutch 2 is steadily increased over the same period. The clutch forces applied to clutches 1 and 2 is controlled so that the total torque transmitted by the VST remains substantially constant while drive is handed over from clutch 1 to clutch 2. This helps to minimise fluctuation in the torque transmitted by the VST 9 during the handover operation.

In FIG. 7 the clutch force for clutch 2 after handover is shown as being the same as the clutch force for clutch 1 before handover, for convenience. In practice, the torque transmitted by the VST depends on both the torque transmitted through the active clutch and the transmission ratio between the clutch and the point where the torque value is to be considered. In general, it is desired to control the torque applied to the energy source and/or sink (i.e. the drivetrain coupling 7 in this embodiment). Since the transmission ratio through the range extender 11 does not change during this handover process in the VST, it is sufficient to consider the value of torque at the end of the VST 9 towards the range extender 11. Depending on the construction of the VST, the transmission ratio between the clutch and this end of the VST may be different for clutch 1 and clutch 2, and so different clutch forces may be required to transmit the same torque at the end of the VST nearest the range extender 11. Any such difference in the desired clutch forces for the different clutches will be taken into account in the control of the clutch forces during the handover operation.

At a convenient point during the handover operation, the modulation of VST clutch force in response to errors in the range extender clutch slip speed is transferred from VST clutch 1 to VST clutch 2. In the embodiment of FIG. 7, this transfer happens at or very shortly after time a, as soon as clutch 2 begins to transmit drive. However, other arrangements are possible, such as transferring the speed control modulation from clutch 1 to clutch 2 as the clutch force values cross over, so that speed control always uses the VST clutch with the greatest clutch force. The handover operation is complete at time b, which is preferably just before the slip speed of VST clutch 1 reaches zero. It is desirable to delay the handover operation for as long as possible, and to continue to transmit drive through clutch 1 while its slip speed is very low, because energy loss in the slipping clutch is dependent on the speed at which the clutch slips and therefore it is most energy efficient to continue to use the clutch to transmit drive while its clutch slip speed is very low. However, it is also important that drive is removed from a clutch no later than the moment when its slip speed reaches zero, because if the clutch is engaged with negative slip it will transmit torque in the opposite direction, both increasing energy wastage and reducing the total torque transmitted through the variable slip transmission 9.

After time b, torque transmission continues with torque transmitted through the variable slip transmission by clutch 2, until a handover operation from clutch 2 to clutch 3 is initiated at time c as the slip speed of clutch 2 approaches zero. The operation to hand drive over from clutch 2 to clutch 3 proceeds in the same way as the handover operation from clutch 1 to clutch 2. This operation is complete by time d and then drive is transmitted through the variable slip transmission by clutch 3 until its slip speed approaches zero at time e. Throughout this period, drive is transmitted through the range extender by clutch A. The clutch force applied to clutch A does not vary, and its slip speed is maintained at a constant low magnitude by feedback control to the active clutch of the variable slip transmission. At time e it is necessary to hand over from range extender clutch A to range extender clutch B, because there is no further clutch in the variable speed transmission 9 to which drive can be handed over from clutch 3, and the variable slip transmission 9 has reached the end of its transmission ratio range.

While the range extender hands drive over from clutch A to clutch B, the variable slip transmission needs to return to the other end of its transmission ratio range. Accordingly, it will hand drive over from clutch 3 to clutch 1. However, as can be seen in FIG. 7, the slip speed for clutch 1 at time e is a large negative value, i.e. the clutch slip is in the wrong direction. The variable slip transmission 9 will only be able to transmit torque in the correct direction once the rotational speed of the intermediate mass 51 has reduced sufficiently for the clutch slip of VST clutch 1 to become positive. Accordingly, this handover operation is more complex than the operations for handing drive over from VST clutch 1 to VST clutch 2 and from VST clutch 2 to VST clutch 3.

At time e clutch force is removed rapidly from VST clutch 3, and the clutch force becomes zero shortly afterwards at time f. At the same time, response to range extender clutch slip speed errors is transferred from clutch 3 to clutch 1. Also at time e, the required clutch slip speed for range extender clutch A is progressively reduced, so that the slip speed of clutch A will reach zero at time g. The clutch force for range extender clutch A is steadily reduced over this period while the clutch force for range extender clutch B is increased, and these forces are controlled so that the total torque transmitted to the energy source/sink (drivetrain coupling 7) remains substantially at the desired level and torque fluctuations are minimised during this handover operation. The clutch force on range extender clutch A is arranged to reach zero at or very shortly before the moment when its clutch slip speed reaches zero at time g. As discussed with reference to the handover from clutch 1 to clutch 2 in the variable slip transmission 9, the clutch force for clutch B after handover in the range extender 11 may be different from the clutch force for clutch A before handover, in order to provide the same level of torque. However, these clutch forces are shown at the same level in FIG. 7 for convenience.

During the period from time e to time g, in which a clutch force is applied to both clutches of the range extender 11, the range extender clutch slip error is calculated from the clutch slip speed of the range extender clutch from which force is being withdrawn, i.e. clutch A. As shown in FIG. 7, this error is used to modulate the clutch force of the newly-selected VST clutch, i.e. clutch 1. However, the force applied to this clutch does not include a component based on the desired transmission torque during this period. As previously explained, it is more efficient if the rotational velocity of the intermediate mass 51 is changed by the application of torque substantially entirely from the range extender, since this involves torque transmission in the correct direction, and any clutch force applied to clutch 1 of the variable slip transmission while its slip speed is negative will increase energy wastage. Therefore the rate of change of the required clutch slip speed of the range extender clutch during the handover operation is calculated so as to correspond approximately to the rate at which the intermediate mass 51 slows down as it transmits torque through the range extender 11 to the energy source/sink. However, in order to ensure a smooth handover in the range extender 11 and to ensure that there is no loss of torque during this operation, the rate of change of the required clutch slip in the range extender may optionally be made slightly faster than would happen simply as a result of slowing down the intermediate mass 51 by using its angular momentum to drive the energy source/sink through the range extender 11. If this option is used, it will create a small residual speed error which can be used to generate a very slight clutch force for clutch 1 of the variable slip transmission. This results in a slight engagement of clutch 1 with a negative slip, tending to assist the intermediate mass 51 to slow down, so as to ensure that the clutch slip speed in the range extender 11 changes at the required rate. This ensures that the clutch slip and the torque transmission in the range extender 11 remains fully controlled while the speed of the intermediate mass 51 is varied. Engagement of clutch 1 of the VST while the intermediate mass 51 is slowing down will also make it slow down faster, thereby reducing the time taken for drive to shift from one clutch to the next in the range extender.

At time g, as the slip speed of range extender clutch A reaches zero, the clutch force for range extender clutch A also reaches zero and clutch force for range extender clutch B is now equal to the calculated force required to transmit the desired torque to the energy source/sink. At the same time, the clutch slip error signal calculation is switched, so as to be based on the clutch slip speed of clutch B instead of clutch A. At time g, the slip speed of clutch B is likely to be greater than the predetermined low magnitude slip speed for the range extender clutch, but this slip speed continues to reduce as the intermediate mass 51 continues to slow down while it delivers torque through clutch B. As the speed of rotation of the intermediate mass 51 reduces, the speed difference across variable slip transmission clutch 1 becomes zero and then becomes positive, and it is now possible for clutch 1 to transmit torque in the correct direction from the energy storage device (flywheel 1) to the intermediate mass 51. Accordingly, as the clutch slip speed of range extender clutch B approaches the required value, a clutch force corresponding to the required level of transmitted torque is applied to VST clutch 1, and drive is once again transmitted from the energy source to the intermediate mass 51. Because the transmission ratio through clutch B of the range extender 11 is different from the transmission ratio through clutch A, it will be necessary to apply a different clutch force to clutch 1 of the VST and transmit a different level of torque through it, compared to the clutch force and level of torque when VST clutch 1 was used with range extender clutch A, in order to apply the same level of torque at the energy source/sink. The clutch forces are show at the same level in FIG. 7 for convenience of illustration only.

The force applied to clutch 1 is modulated in response to the measured clutch speed error of range extender clutch B, and at time h the value of the range extender clutch slip reaches its required level. From this time onwards, the pattern of clutch slip and clutch force in the variable slip transmission 9 and the range extender 11 repeats from the beginning of FIG. 7, except that now the active range extender clutch is clutch B instead of clutch A. The variable slip transmission 9 will hand over from clutch 1 to clutch 2 and then to clutch 3 as the clutch slip speeds reduce, and the variable slip transmission will traverse its range of transmission ratios until once again VST clutch 3 approaches zero slip, and then a similar range extender clutch handover operation will take place to transfer drive in the range extender from clutch B to clutch C.

The operations shown in FIG. 7 can be interrupted at any time if the torque demand applied to the energy storage and recovery system is changed. If there is a simple change in torque demand without any change in torque transfer direction, this can be accommodated by changing the clutch force applied to the active clutches appropriately. If clutch demand is removed altogether (i.e. the torque demand becomes zero), the required clutch force becomes zero and one or both of the range extender clutch and the variable slip transmission clutch is opened completely, so as to remove all drive connection between the energy storage device and the energy source/sink.

FIG. 7 has been described on the basis that energy is being transmitted from the storage device to the energy source/sink. However, the process is the same for transmission of torque in the opposition direction. However, in this case the required direction of clutch slip is reversed. Accordingly, the direction of clutch slip corresponding to positive slip in FIG. 7 now becomes negative slip and vice versa.

Figure 8:
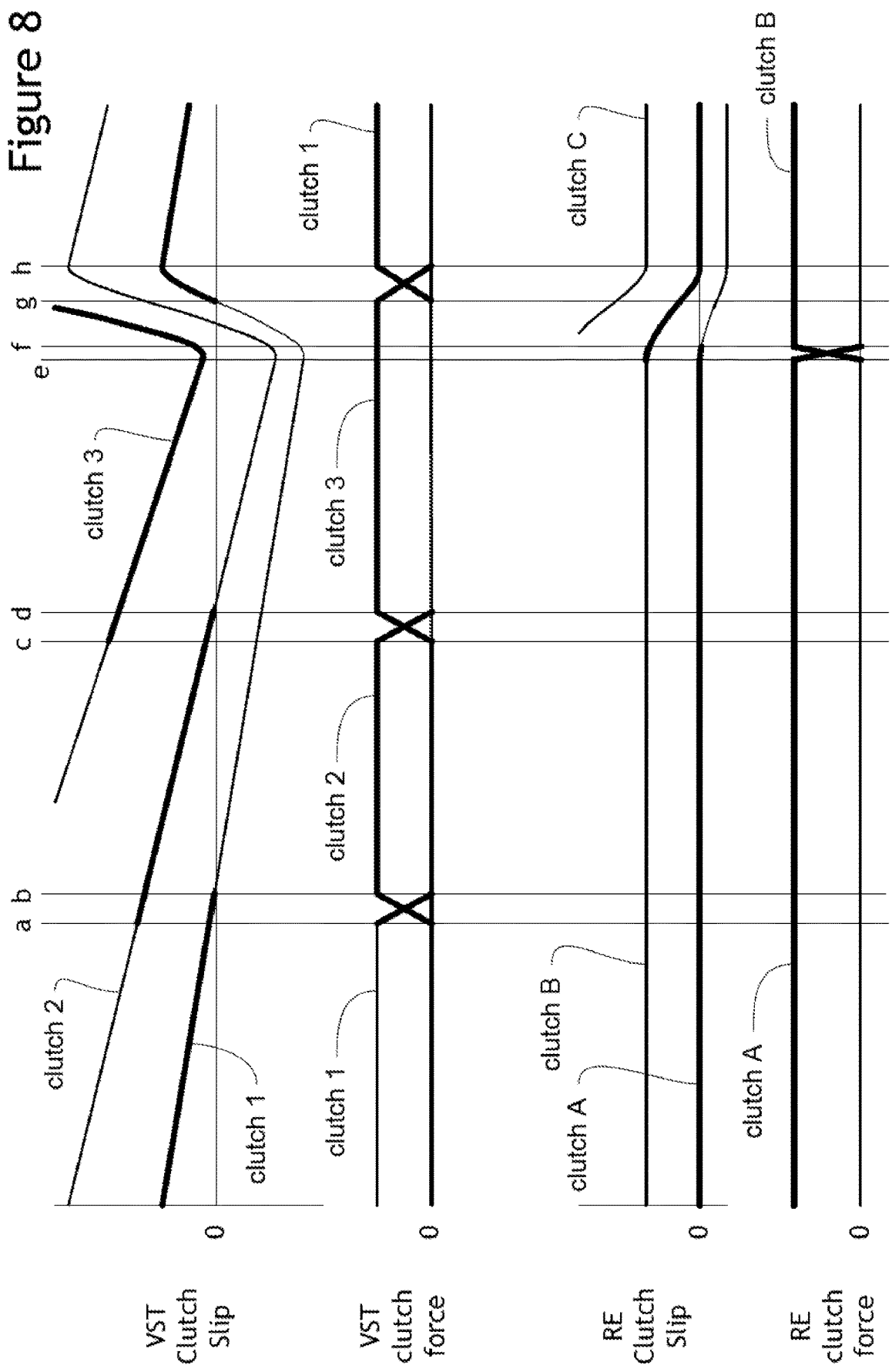
FIG. 8 shows graphs for clutch slip and clutch force in the variable slip transmission and the range extender of an embodiment of the present invention having a range extender towards the energy storage device and a variable slip transmission towards the energy source/sink, with a 3-by-3 set of ratios.

FIG. 8 shows graphs for clutch slip and clutch force in the variable slip transmission and the range extender, corresponding to FIG. 7, for an alternative embodiment based on FIG. 3. In this embodiment, the range extender 11 is provided at the end of the transmission towards the energy storage device (flywheel 1) and the variable slip transmission 9 is provided at the end of the transmission towards the energy source/sink (drivetrain coupling 7). In this case, the variable slip transmission 9 provides the clutch closest to the energy source/sink, and consequently there is little if any benefit in slipping the clutch of the range extender 11. Therefore in this embodiment the range extender clutch is not slipped except during handover from one clutch to another within the range extender 11. Consequently the range extender clutch force is greater than that required to transmit the required level of torque, in order to ensure that the selected range extender clutch is fully engaged with zero slip. The force applied to the selected clutch of the variable slip transmission 9 is the force calculated to transmit the torque required to be applied by the energy storage and recovery system to the energy source/sink. Since there is only one slipping clutch between the energy source/sink and the energy storage device in this arrangement, there is no need for any separate control of clutch slip speed. Accordingly, there is no need to modulate the clutch force applied to the active clutch in the variable slip transmission 9.

If it is desired, for any reason, to slip the clutch that transmits drive through the range extender, it is preferred to correct any clutch slip speed errors by modulating the clutch force applied to the clutch in the range extender, i.e. the modulation is applied to the same clutch that has the slip speed error to be corrected. This helps to prevent the modulation of clutch force from creating fluctuations in the torque applied to the drivetrain. However, as noted above the clutch in the range extender 11 will not normally slip and so there will be no slip speed error to correct.

In the same way as in FIG. 7, bold lines are used in FIG. 8 to show the clutches that transmit drive. Accordingly, the bold lines overlap for the period when two parallel clutches both transmit drive during a handover operation.

Initially, drive is transmitted through clutch 1 of the variable slip transmission and clutch A of the range extender. As in FIG. 7, the clutch slip speed of clutch 1 of the variable slip transmission reduces as torque and energy are transferred through the transmission, and drive through the variable slip transmission is handed over from clutch 1 to clutch 2 in an operation from time a to time b, and from clutch 2 to clutch 3 in an operation from time c to time d in a manner generally similar to that described with reference to FIG. 7, except that there is no monitoring of clutch speed errors and so there is no handover of clutch speed control.

However, the range extender handover operation, initiated when the clutch slip speed of clutch 3 approaches zero, is slightly different. In order to transmit torque in the required direction to the energy source/sink throughout the handover operation, it is necessary to avoid transferring drive from clutch 3 to clutch 1 until the clutch slip value for clutch 1 has become positive. Accordingly, at time e, as the clutch slip of clutch 3 of the variable slip transmission approaches zero, the range extender 9 begins a handover operation but the variable slip transmission does not.

At time e clutch force for range extender clutch A reduces and clutch force for range extender clutch B increases, and this handover takes place very rapidly so that drive is transmitted fully through range extender clutch B by time f. However, drive is still transmitted though the variable slip transmission entirely by clutch 3. The clutch force applied to clutch 3 remains unchanged, and so it continues to transmit the level of torque required to be applied to the energy source/sink. In at least some embodiments, the intermediate mass 51 may be substantial and it cannot be speeded up or slowed down as quickly as drive is handed over from one clutch to another in the range extender 9. Accordingly, even though drive is transmitted entirely through clutch B of the range extender from time f, this clutch is initially slipping. Because the range extender clutch force is higher than the clutch force needed to transmit the desired level of torque to be applied to the energy source/sink, range extender clutch B now applies more torque to the intermediate mass 51 than the intermediate mass 51 applies to clutch 3 of the variable slip transmission. This imbalance of torques results in a net torque applied to the intermediate mass 51. Accordingly, the speed of rotation of the intermediate mass 51 changes under the influence of the net torque applied to it, reducing the clutch slip in the range extender 11 and increasing the clutch slip in the variable slip transmission 9. As a result the clutch slip for clutch 1 of the variable slip transmission becomes positive at time g and it now becomes possible to transfer drive from clutch 3 to clutch 1 in the variable slip transmission. This operation begins immediately at time g, since the energy loss through clutch 3 (now with a high slip speed) is greater than the energy loss that arises if drive is transmitted through clutch 1 from time g onwards.

Because the active clutch in the variable slip transmission 9 is the clutch closest to the energy source/sink in this arrangement, it is preferable to transfer drive from clutch 3 to clutch 1 smoothly, and therefore the clutch force applied to clutch 3 reduces steadily from time g to time h while the clutch force applied to clutch 1 increases. The clutch forces are controlled so that the total torque applied to the energy source/sink is maintained at substantially the desired level. At time h, the handover of drive from clutch 3 to clutch 1 is complete, and the variable slip transmission 9 begins its traverse through its transmission ratio range while the range extender 11 is transmitting drive through clutch B. In FIG. 8, the clutch slip of range extender clutch B reaches zero, and the clutch stops slipping, at or around time h, but in practice this could happen earlier or later than time h.

In order to reduce the energy loss caused by the high slip speed at clutch 3 of the VST 9 during this operation for handover from one clutch to another in the range extender 11, it is possible to transfer (hand over) drive from clutch 3 of the VST to clutch 2 of the VST once the direction of slip of clutch 2 of the VST has become positive, and then transfer drive from clutch 2 to clutch 1 in the VST once the direction of slip of clutch 1 has become positive. However, this means that two clutch handovers are required in the VST, making the operation more complicated and potentially increasing the extent of slight torque fluctuations at the energy source/sink.

It is preferred that operations to hand over drive from one clutch to another are conducted smoothly, with a substantially constant (or controlled) total torque through the clutches involved, as described above. This helps to minimise fluctuations in the level of torque applied by the energy storage and recovery system to the energy source/sink. This is particularly the case for handover of drive between the clutches that are closest to the energy source/sink since there is no intervening clutch in this case that can be slipped in order to prevent transmission of torque fluctuations.

Figure 9:
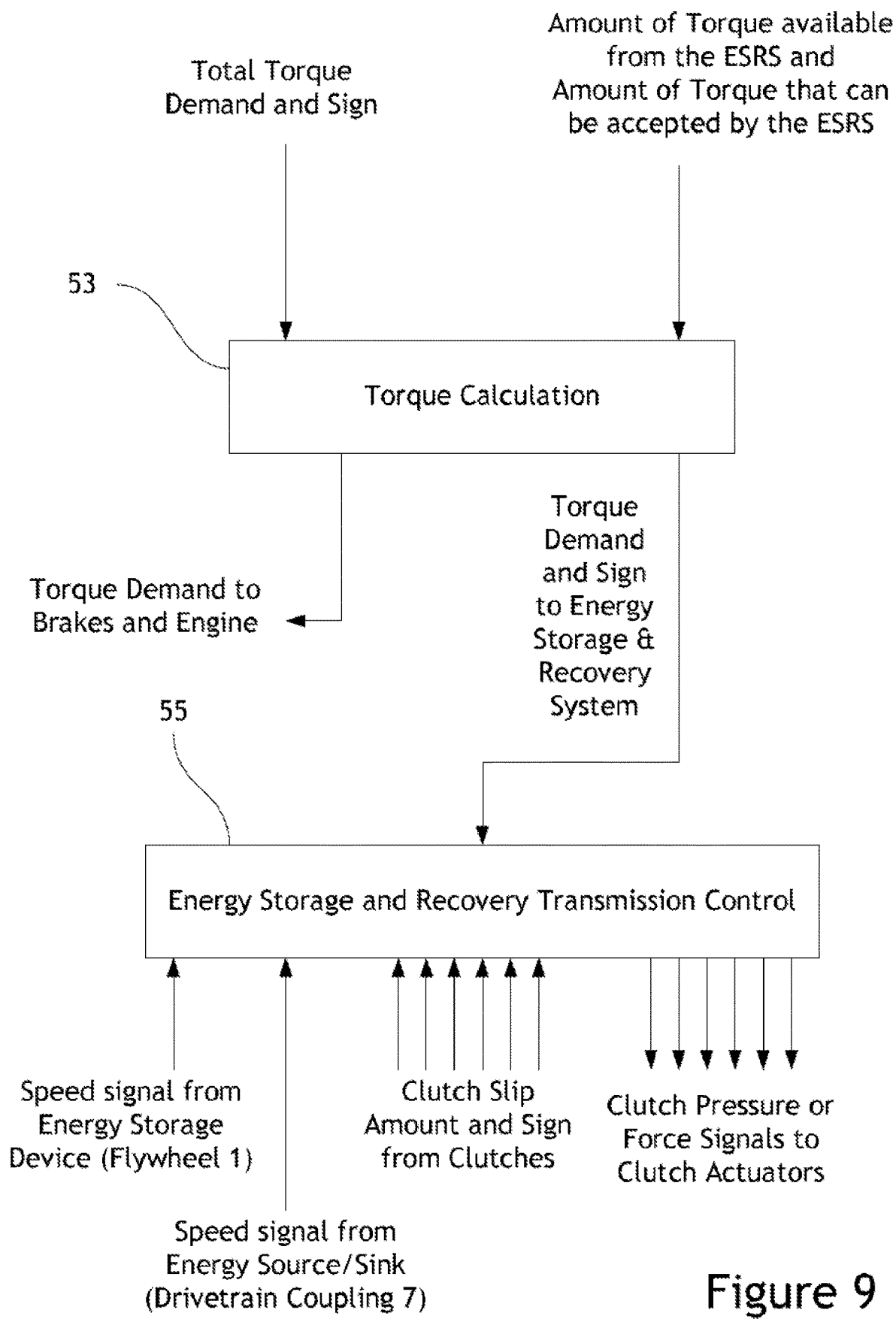
FIG. 9 shows schematically a control arrangement for an embodiment of the present invention.

FIG. 9 shows schematically the overall control arrangement for the energy storage and recovery system (ESRS) of the embodiments described above. This may be implemented in software, hardware or a mixture, and may be implemented in a single device or system or in separate systems, as required in any particular case. At least part of the arrangement of FIG. 9 may be implemented as software in an electronic control unit for the ESRS.

The control system receives an input indicating the total torque demand and the sign of the torque (i.e. energy storage or energy recovery) for the overall system that includes the energy storage and recovery system. For example, if the overall system is a vehicle powertrain, this may be a vehicle torque demand from the accelerator pedal or a torque control system, or from a brake pedal. Alternatively, the overall system may be the drive system for raising or lowering a component such as a boom or lifting arm or it may be the drive system for a rotating cab. The total demanded torque may be a drive torque or a braking torque.

The total torque and sign is provided to a torque calculation function 53, which also receives an input from the energy storage and recovery system (ESRS), based on the current state of the energy storage device, indicating the amount of torque available from the ESRS and the amount of torque that can be accepted by the ESRS. The torque calculation function determines how much of the total torque demand can be met by supplying energy to or drawing energy from the energy storage and recovery system. As a result of that calculation, it sends a signal indicating torque demand and sign to the energy storage and recovery system. If the energy storage and recovery system cannot supply the total torque required according to the total torque demand signal, a torque demand corresponding to the remainder of the torque is transmitted to a control system for the motor and/or brake system of the overall apparatus.

The torque demand and sign signal for the energy recovery and storage system is received by an energy storage and recovery transmission control module 55 in the energy storage and recovery system. This receives a signal from each clutch in the transmission of the energy recovery and storage system indicating the direction and amount of slip of the clutch, and it is able to send a signal to the actuator for each clutch indicating the required clutch pressure or clutch force (depending on the type of signal required by the actuator). Additionally, by way of feedback control, it may optionally receive signals indicating measured clutch pressure or force. The energy storage and recovery transmission control module 55 also receives speed signals from the energy storage device (the flywheel 1 in FIGS. 1 to 4) and the energy source/sink (the drivetrain coupling 7 in FIGS. 1 to 4), which allows it to determine the overall drive ratio through the transmission of the ESRS.

If the torque demand from the torque calculation function 53 is zero, the transmission control system 55 ensures that all of the clutches of at least one stage in the transmission of the energy recovery and storage system are fully disengaged, so that the energy storage device is neither receiving nor delivering energy. If a non-zero torque demand signal is received, the transmission control system determines which path through the transmission of the energy recovery and storage system provides the lowest total clutch slip with the correct direction of slip, and calculates the clutch pressure or force signal values required for the relevant clutches in order to transmit the level of torque demanded. These signals are transmitted to the clutch actuators for the appropriate clutches, to begin the transfer of energy between the energy storage device and the energy source/sink in order to apply the required torque. The required level of clutch slip in the range extender is normally a pre-set value stored in the transmission control system 55, and remains the same for all operations. However, the transmission control system 55 will set the sign for the required clutch slip in both the range extender and the variable slip transmission in accordance with the sign of the required torque received from the torque calculation function 53.

As soon as the clutch actuators engage the relevant clutches, and torque begins to be transmitted through the energy recovery and storage system, clutch slip signals will be received from the clutches in the transmission. The transmission control system 55 monitors the magnitude and the sign of the clutch slip signals from the range extender clutch and the variable slip transmission clutch that have been selected for engagement to transmit drive. If there is any error in the clutch slip of the selected range extender clutch, the clutch pressure or force signal sent to the active clutch in the variable slip transmission 9 is modified accordingly. As previously noted, this may be done using a proportional, a proportional-integral or a proportional-integral-differential control. Additionally, the transmission control system 55 monitors the amount of slip of the selected clutch of the variable slip transmission 9, and performs a clutch handover operation, as described above, when the amount of clutch slip in the variable slip transmission 9 approaches zero.

Figure 10:
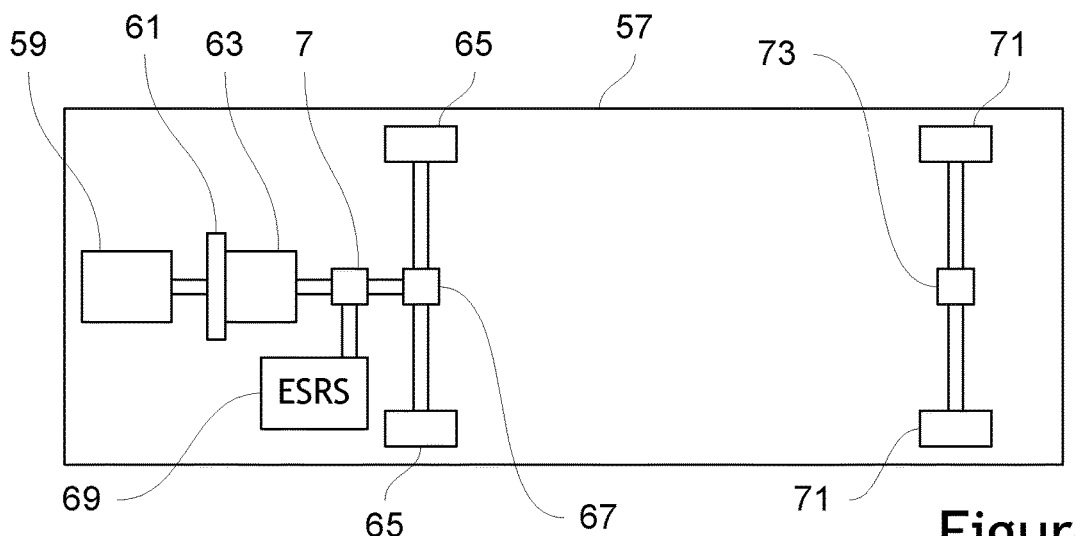
FIG. 10 shows a first example of a vehicle incorporating an embodiment of the present invention.
Figure 11:
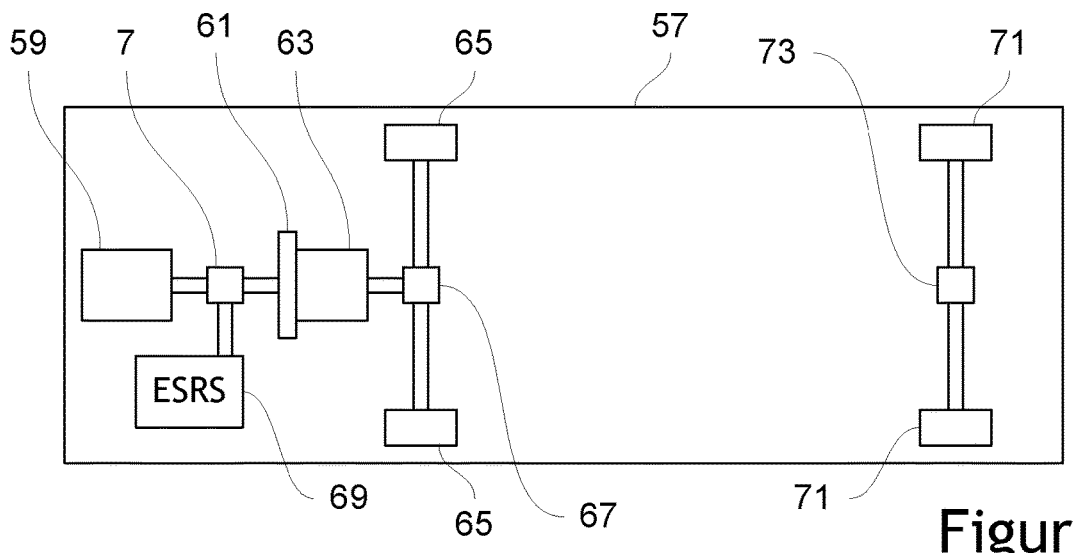
FIG. 11 shows a second example of a vehicle incorporating an embodiment of the present invention.
Figure 12:
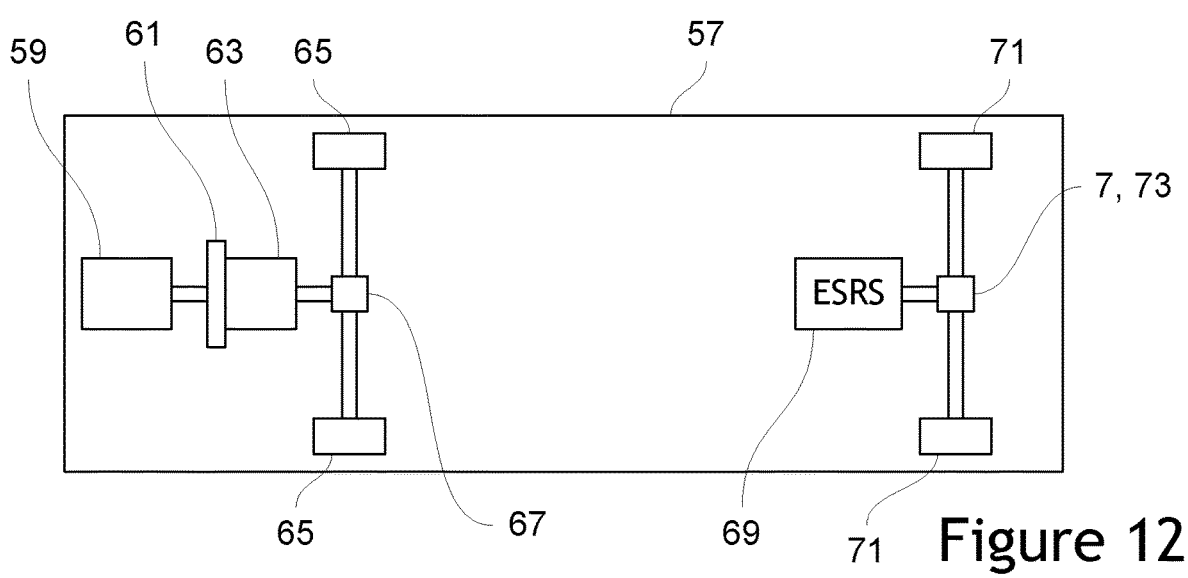
FIG. 12 shows a third example of a vehicle incorporating an embodiment of the present invention.

FIGS. 10, 11 and 12 indicate schematically how an energy recovery and storage system embodying the present invention may be incorporated into the system for driving the wheels of a vehicle.

In FIG. 10, a vehicle 57 is powered by an engine 59, such as an internal combustion engine, which transmits drive through a clutch 61 to a gearbox 63. The gearbox 63 imparts drive to driven wheels 65 via a differential coupling 67. In this embodiment, the drivetrain coupling 7 for the energy recovery and storage system is connected between the gearbox 63 and the differential coupling 67. With this arrangement, it is possible for the energy recovery and storage system to apply a braking torque to the driven wheels 65 to slow the vehicle, with kinetic energy of the vehicle being delivered from the driven wheels 65 through the differential coupling 67 and the drivetrain coupling 7 to the energy recovery and storage system 69, allowing it to be stored in the energy storage device such as the flywheel 1. The energy recovery and storage system 69 can also apply torque to the driven wheels 65, via the drivetrain coupling 7 and the differential coupling 67, to accelerate the vehicle 57, with energy stored in the energy storage device of the energy recovery and storage system 69 being converted into kinetic energy of the vehicle 57. If desired, the operations of transferring energy between the driven wheels 65 and the energy storage and recovery device 67 can take place while the clutch 61 disengages the vehicle engine 59 from the gearbox 63 and the remainder of the transmission to the driven wheels 65, or while the gearbox 63 is in neutral, and in this case the engine 59 could be switched off to save fuel.

FIG. 11 shows an alternative arrangement, in which the drivetrain coupling 7 is connected between the engine 59 and the clutch 61 and gearbox 63 of the vehicle. This arrangement allows for the same transfer of torque and energy between the driven wheels 65 of the vehicle and the energy storage and recovery system 69, but the engine 59 will also be engaged during these operations. However, drive between the wheels 65 and the energy storage and recovery system 69 now passes through the gearbox 63 in addition to the transmission within the energy storage and recovery system 69, increasing the total range of transmission ratios between the wheels 65 and the energy storage device.

Additionally, the arrangement of FIG. 11 allows energy transfer between the engine 59 and the energy storage and recovery system 69 while the clutch 61 is disengaged so that there is no transmission to the wheels 65. This allows for further operations such as the use of the energy storage and recovery system to start the engine 59, and the use of the engine 59 to store energy into the energy storage and recovery system 69 if desired while the vehicle 57 is stationary and in neutral gear.

In the arrangement of FIG. 12, the energy storage and recovery system 69 is connected to undriven wheels 71 of the vehicle 57, and the drivetrain coupling 7 is integrated into a differential coupling 73 for the undriven wheels 71.

The embodiments described above are given by way of non-limiting example, and further alternatives will be apparent to those skilled in the art.

We claim:

1. A transmission for transmitting torque between an energy storage device and an energy source and/or sink, the transmission comprising a plurality of clutches in series, each of said clutches being operable to transmit torque while slipping substantially continuously;

the transmission comprising a transmission control system adapted to control a first of said plurality of clutches to transmit a predetermined level or range of torque while slipping substantially continuously and to control a second of said plurality of clutches in response to variations in a speed of slip of one of said plurality of clutches while the first and second clutches are both slipping.

2. The transmission of claim 1, wherein the transmission control system is arranged to control the second of said plurality of clutches in response to variations in a speed of slip of the first of said plurality of clutches.

3. The transmission of claim 2, wherein the second of said plurality of clutches a clutch of a variable slip transmission.

4. The transmission of claim 1, wherein the transmission control system is arranged to control the second of said plurality of clutches in response to variations in a speed of slip of the second of said plurality of clutches.

5. The transmission of claim 4, wherein the first of said plurality of clutches is a clutch of a variable slip transmission.

6. An energy storage and recovery system comprising:
an energy storage device; and
the transmission of claim 1, wherein the energy storage device is coupled to the transmission and the second of said plurality of clutches is coupled between the energy storage device and the first of the said plurality of clutches.

7. An energy storage and recovery system comprising:
an energy storage device; and
the transmission of claim 1, wherein the energy storage device is coupled to the transmission and the first of said plurality of clutches is coupled between the energy storage device and the second of the said plurality of clutches.

8. A method of controlling a transmission comprising a plurality of clutches in series between an energy storage device and an energy source and/or sink, comprising operating a transmission control system to control a first of the plurality of clutches to deliver a predetermined level or range of torque while the first of the plurality of clutches slips substantially continuously, and control a second of the plurality of clutches in response to variations in a speed of slip of one of said plurality of clutches while the first and second clutches are both slipping.

9. The method of claim 8, comprising controlling the second of said plurality of clutches in response to variations in a speed of slip of the first of said plurality of clutches.

10. The method of claim 8, comprising controlling the second of said plurality of clutches in response to variations in a speed of slip of the second of said plurality of clutches.

11. The method of claim 8, wherein the second of said plurality of clutches is coupled between the energy storage device and the first of the said plurality of clutches.

12. The method of claim 8, wherein the first of said plurality of clutches is coupled between the energy storage device and the second of the said plurality of clutches.

13. The transmission of claim 1, wherein the transmission control system is arranged to control the second of said plurality of clutches so as to keep said speed of slip of said one of said plurality of clutches constant or within a predetermined range.

14. The transmission of claim 1, wherein the energy storage device comprises a flywheel.

15. The method of claim 8, wherein the second of said plurality of clutches is controlled so as to keep said speed of slip of said one of said plurality of clutches constant or within a predetermined range.

16. The method of claim 8, wherein the energy storage device comprises a flywheel.

17. The transmission of claim 1, wherein the transmission system is adapted to generate and transmit first and second signals to first and second actuators associated with the first and second clutches, respectively, to control the first and second clutches.

18. The method of claim 8, wherein operating the transmission control system to control the first and second clutches includes generating and transmitting first and second signals to first and second actuators associated with the first and second clutches, respectively.

* * * * *